Figure 1:
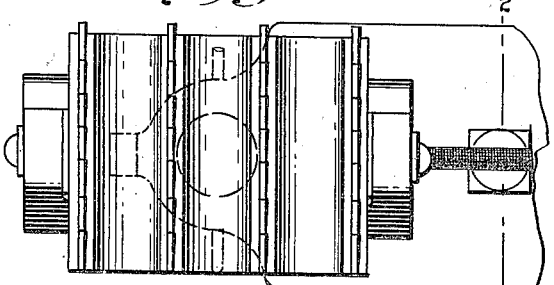

C. E. EVANS.
LUMBER JACK.
APPLICATION FILED OCT. 10, 1913.

1,092,704.

Patented Apr. 7, 1914.

WITNESSES

INVENTOR
Charles E. Evans
BY
ATTORNEYS

UNITED STATES PATENT OFFICE.

CHARLES EDMOND EVANS, OF WEED, CALIFORNIA.

LUMBER-JACK.

1,092,704.

Specification of Letters Patent.

Patented Apr. 7, 1914.

Application filed October 10, 1913. Serial No. 794,408.

*To all whom it may concern:*

Be it known that I, CHARLES E. EVANS, a citizen of the United States, and a resident of Weed, in the county of Siskiyou and State of California, have invented a new and Improved Lumber-Jack, of which the following is a full, clear, and exact description.

My invention has for its object to provide a lumber jack which may be manufactured in four principal castings at very little expense.

The jack has a yoke with a stud journaled in a vertical bearing in a supporting arm, and journaled in the arms of the yoke, there are studs which carry a member having teeth for engaging the lumber. The teeth are inclined in one direction relatively to the yoke, it being possible to adjust the yoke relatively to the supporting arm to hold the yoke yieldingly in this position so that the teeth will normally be inclined as desired relatively to the supporting arm. Pins extend from the member having the teeth for engaging the yoke to limit the movement of the member. Mounted on the studs of the yoke there is a collar which is held in adjusted position relatively to the stud by a cotter pin extending in orifices in the collar and the stud, this collar being provided with a flange for engaging the supporting arm to check the rotary movement of the yoke relatively thereto.

Still other objects will appear in this specification in which the preferred form of the invention is disclosed.

Similar reference characters refer to similar parts in all the views in which—

Figure 2:
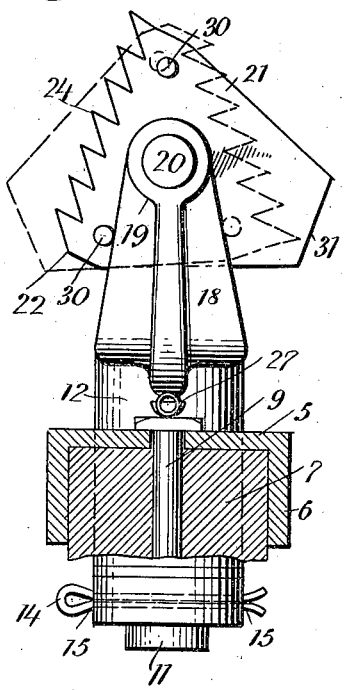
Figure 3:
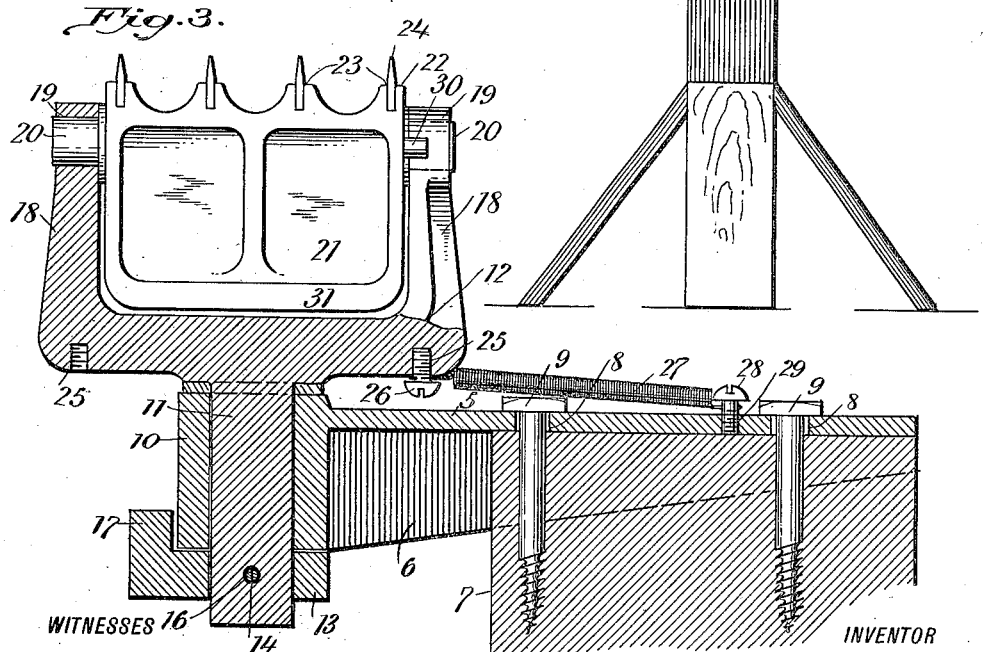

Figure 1 is a plan view of the invention;
Fig. 2 is a sectional view on the line 2—2 of Fig. 1; Fig. 3 is an enlarged sectional view of the invention on a line extending longitudinally of the supporting arm, and Fig. 4 is a view showing a slightly modified form of the invention as it is supported on a standard.

By referring to the drawings, it will be seen that a supporting arm 5 is provided, this supporting arm 5 having depending sides 6 for engaging the sides of a standard 7 against the top of which the body of the supporting arm 5 rests. This supporting arm 5 has openings 8 through which screws 9 are disposed, these screws 9 extending into the standard 7 in a manner readily understood. At the outer end of the supporting arm 5 there is a vertical bearing 10 through which extends a stud 11 on the yoke 12, a collar 13 being mounted on the stud 11 below the bearing 10 and being secured in an adjusted position relatively to the stud 11 by the cotter pin 14 which extends through orifices 15 in the collar 13 and through an orifice 16 in the stud 11. This collar 13 is provided with an upwardly extending flange 17 for engaging the depending sides 6 of the arm 5 for limiting the rotary movement of the yoke 12 relatively to the arm 5 and its bearing 10. The yoke 12 has upwardly extending arms 18 which are provided with bearings 19 in which are journaled studs 20 projecting outwardly from the lumber engaging member 21. This lumber engaging member 21 has a face 22 with channels 23 in which are disposed rows of teeth 24, these teeth 24 being inclined in one direction relatively to the lumber engaging member 21 as will be seen by referring to Fig. 2 of the drawings.

In order that the lumber jack may be operated from the left hand as well as from the right hand, it is necessary that the yoke 12 be rotated 180° relatively to the bearing 10 and in order that the yoke 12 may be held yieldingly in either position, two threaded orifices 25 are made in the yoke 12, one at each side. A screw 26 is provided meshing in either of the threaded orifices 25 and this screw 26 is secured to the spring 27 which is secured to the screw 28 meshing in a threaded orifice 29 in the supporting arm 5. In this manner the yoke 12 is held yieldingly relatively to the supporting arm 5 with the teeth 24 inclined to the right or to the left of the supporting arm 5 as desired. The lumber engaging member 21 has projecting pins 30 which are disposed adjacent the ends of the face 22 of the lumber engaging member 21, these pins 30 being provided for engaging the arms 18 of the yoke 12 to limit the rotary movement of the lumber engaging member 21. This lumber engaging member 21 has a counterweight 31 disposed a considerable distance from the face 23 and equal distances from the ends of the face 23, this counterweight 31 serving to hold the lumber engaging member 21 yieldingly with the teeth upwardly extended.

Figure 4:
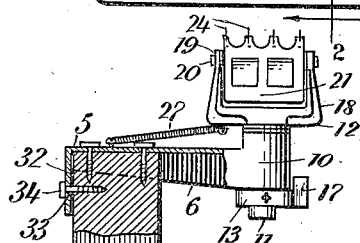

In the constructions shown in Fig. 4 of the drawings, the supporting arm 5 has a depending flange 32 at its inner end which engages the rear of the support 7. This flange 32 has an orifice 33 in which a screw 34 is disposed, the screw being turned home in the support in the customary manner.

Having thus described my invention, what I claim as new and desire to secure by Letters Patent is:

1. In a lumber jack, a supporting arm having a bearing, a yoke having arms, and a stud journaled in the bearing, there being an orifice in the stud, a collar mounted on the stud and provided with an orifice for registering with the orifice in the stud, and with a flange for engaging the supporting arm to check the rotary movement of the yoke, a spring secured to the supporting arm and adapted to be secured as desired to the yoke for holding the yoke yieldingly in a predetermined position relatively to the supporting arm a member pivoted to the arms of the yoke and provided with means for engaging lumber, and a pin disposed in the orifices.

2. In a lumber jack, a supporting arm having a bearing, a yoke having arms, and a stud journaled in the bearing there being an orifice in the stud, a collar mounted on the stud and provided with an orifice for registering with the orifice in the stud, and with a flange for engaging the supporting arm to check the rotary movement of the yoke, a spring secured to the supporting arm and adapted to be secured as desired to the yoke for holding the yoke yieldingly in a predetermined position relatively to the supporting arm, a member pivoted to the arms of the yoke and provided with teeth, pins on the member for engaging the arms of the yoke to limit the rotary movement of the member relatively to the yoke, and a pin disposed in the orifices.

3. In a lumber jack, a supporting member having a bearing, a yoke having arms, and a stud journaled in the bearing, a member having a face with teeth, the member being journaled in the arms of the yoke, pins projecting from the member adjacent the ends of the said face for engaging the arms of the yoke for limiting the rotary movement of the second member relatively to the yoke, and a counterweight on the second member spaced from the said face and at substantially equal distances from the pins.

In testimony whereof, I have signed my name to this specification in the presence of two subscribing witnesses.

CHARLES EDMOND EVANS.

Witnesses:
JAMES G. CROCKETT,
R. P. CLARK.